April 23, 1963
J. H. GRAY
3,086,736
PARACHUTE RISERS
Filed Nov. 16, 1959
2 Sheets-Sheet 1
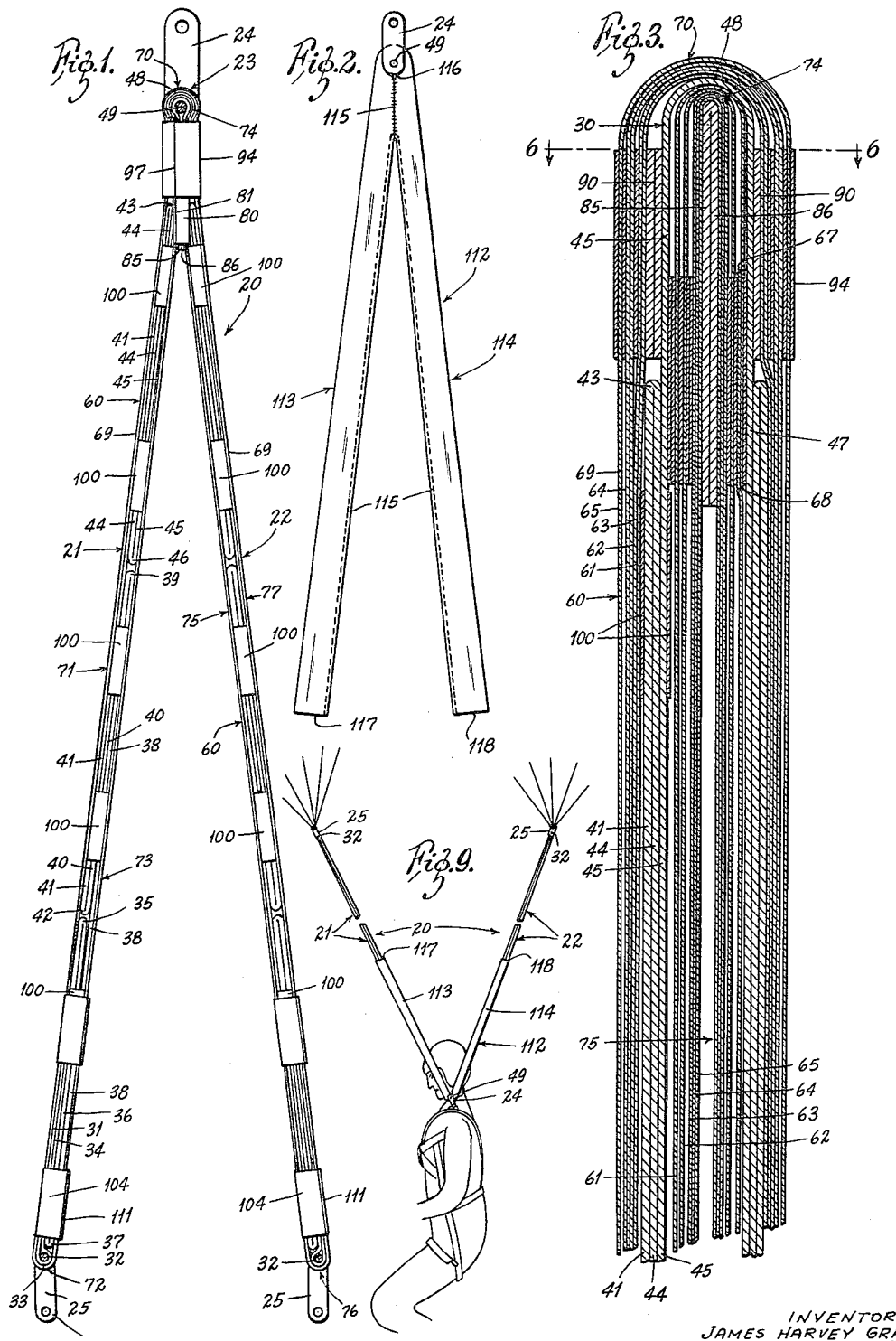
INVENTOR:
JAMES HARVEY GRAY,
BY Kingsland, Rogers & Ezell
ATTORNEYS

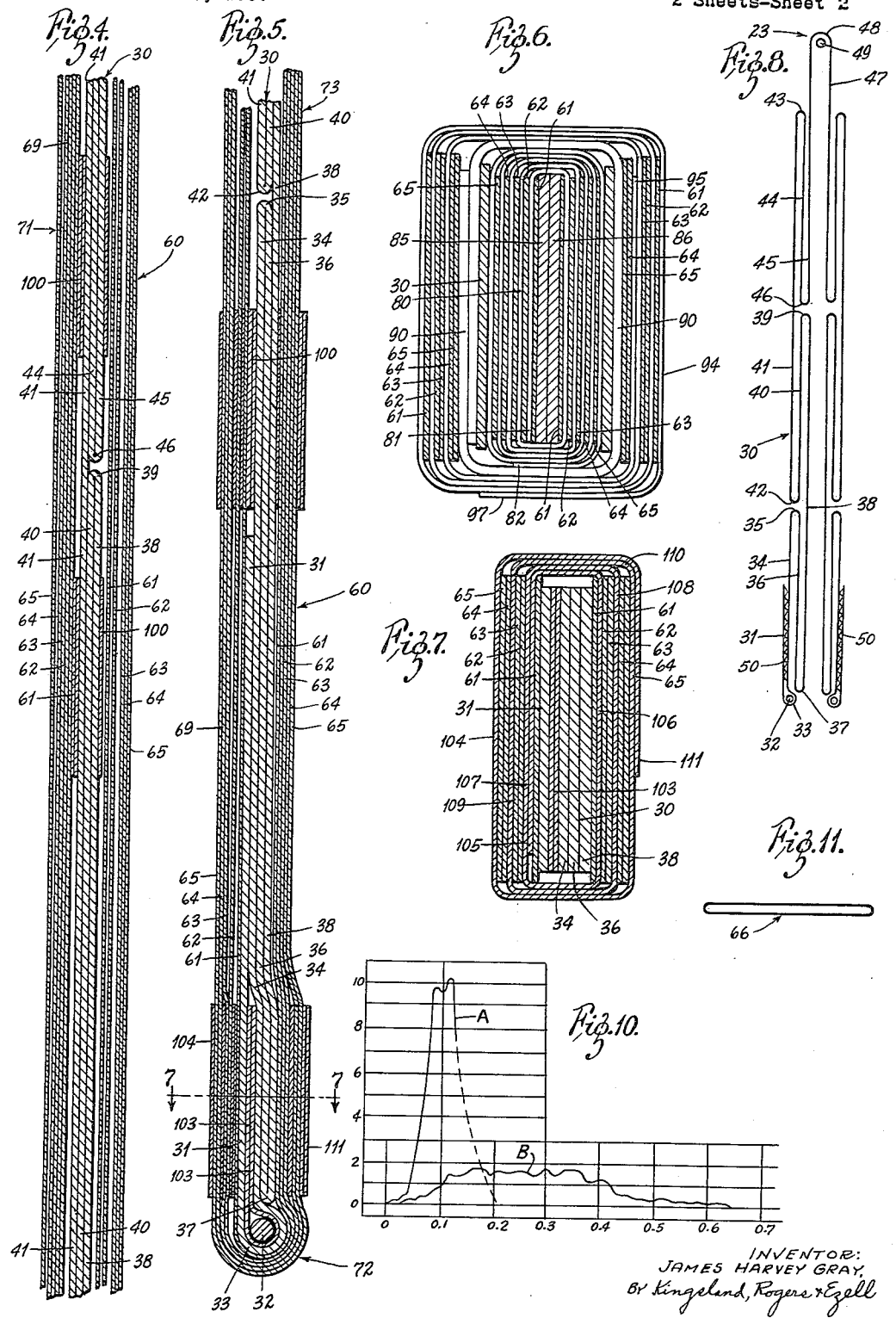

United States Patent Office 3,086,736
Patented Apr. 23, 1963

3,086,736
PARACHUTE RISERS
James Harvey Gray, St. Louis, Mo., assignor to Harvey Gray & Associates, Inc., Clayton, Mo., a corporation of Missouri
Filed Nov. 16, 1959, Ser. No. 853,155
15 Claims. (Cl. 244—151)

The present invention relates to parachutes and particularly to a parachute construction employing non-yieldable risers, together with yieldable shock absorbing straps connected between the parachute and the object dropped by parachute. The shock absorbers are connected to the same extremes as the risers by means of conventional hardware and it is the structure of the shock absorbers, together with their arrangement with the risers and the manner in which they operate, which is the particular object of this invention.

According to the invention, the shock absorbing material is formed in flattened extruded tubes and is connected alongside the risers. The risers are longer than the unextended shock absorbers and are folded. The folding is accomplished in such a way that the shock absorbers will take up the entire initial forces and will maintain the entire load until they have elongated approximately 300%. Thereafter, the residual load is transferred to the risers. This action is possible because of the difference in length between the shock absorbers and risers, the former being approximately a third the length of the latter.

Obviously, if the shock absorber material serves to reduce the magnitude of shock and impact loads, a tremendous reduction in harm or possible destruction to the suspended load is accomplished. Such is precisely the result in the present invention, and it is a primary object of the invention to provide a parachute arrangement having a combination of risers and shock absorbers connected between the canopy and suspended load whereby the shock absorbers alone are subjected to the canopy opening forces and to other initial shock forces, transferring the load to the conventional risers only after they have elongated a considerable amount, at which time substantially all the forces have occurred and have been absorbed by the shock absorbers.

Another object of the invention is to provide a manner of folding the risers and shock absorbers into a compact unit which will fit into the parachute pack, but yet respond immediately to the opening of the canopy. It will be recognized that certain problems could arise in the folding of such a combination of risers and shock absorbers, inasmuch as there is a substantial difference in length between the two before the parachute is placed in use.

Another object of the invention is to provide shock absorbers for a parachute which are so formed that tearing of the shock absorber material is minimized, if not completely eliminated. This object is accomplished by forming the shock absorber straps of extruded tubular formation, thereby increasing the tear resistance. It also provides a means of preventing friction burns from occurring on the nylon risers.

In the drawings:

FIGURE 1 is a side elevation view of one pair of risers (formed of a single strap) and shock absorber assembly, with the assembly shown as inverted;

FIGURE 2 is a view similar to FIGURE 1, but on a reduced scale, showing the riser and shock absorber arrangement covered by a sleeve;

FIGURE 3 is a partial view in section, on an enlarged scale, showing the upper portion of the arrangement of FIGURE 1, but with the hardware removed;

FIGURE 4 is a view in section, on the same scale as that of FIGURE 3, showing a continuation of one leg of the riser arrangement of FIGURE 3;

FIGURE 5 is a view in section, on the same scale as FIGURE 4, showing a continuation of the arrangement of FIGURE 4, terminating at the lower end of the riser leg;

FIGURE 6 is a view in section taken along the lines 6—6 of FIGURE 3;

FIGURE 7 is a view in section taken along the lines 7—7 of FIGURE 5;

FIGURE 8 is a schematic diagram showing the manner in which the risers are folded;

FIGURE 9 is a partial view, with parts broken, showing the extended risers supporting a person;

FIGURE 10 is a graph showing a comparison of the shock forces of the present invention to those of a conventional parachute riser arrangement; and FIGURE 11 is a cross-sectional view of one vinyl strap in the form of a flattened tube.

Referring now to the drawings, the riser and shock absorber arrangement is illustrated in FIGURE 1, and is designated generally by the numeral 20. It comprises two legs, 21 and 22, joined at the top 23 and secured to conventional hardware 24, as will be explained. The hardware 24 is of the type adapted to be connected to a parachute harness worn by a person or surrounding an object to be dropped.

At the lower end of each leg, 21 and 22, there is a conventional hardware arrangement 25 to which the ends of the legs 21 and 22 are attached. The hardware 25 is the type which is secured to the connecting lines from the canopy.

There is a continuous strap 30, of nylon or similar unyieldable material, which forms the risers for both legs 21 and 22. This riser strap is considerably longer than the shock absorber straps to be later described, and, accordingly, must be folded next to the shock absorbers in such a way that they can be extended freely during elongation of the shock absorber. The folding arrangement of the nylon strap 30 is illustrated schematically in FIGURE 8 for ease of understanding. As can be seen from that figure, one end 31 of the strap 30 is located toward the lower end of a leg, such as the leg 21, and then the strap 30 is folded on itself and stitched to form a loop about a bar 32, as at 33, which is a part of the hardware 25. The strap 30 then extends upwardly through a length 34 equal to approximately one-third the length of the leg 21. Then there is a reversal of direction of the strap, as at 35, and it extends downwardly again through a length 36 approximately equal to the length 34. The strap then is folded at 37 to extend upwardly for a length 38 equal to approximately double the lengths 34 or 35. The riser strap 30 is then folded at 39 to form two additional lengths 40 and 41 connected at a fold 42. The length 40 is approximately equal to the length 36, and the length 41 is equal to the length 38.

In similar fashion, the length 41 joins in a fold 43, a downwardly extending length 44, and the length 44 joins a length 45 at a fold 46.

The length 45 evolves into another length 47 which extends downwardly along the top of the other leg 22 of the riser arrangement. The lengths 45 and 47 are integral at a bend 48 which is wrapped around a shaft like portion 49 connected to the hardware 24. Following the length 47 there are a number of lengths and turns which are arranged exactly as those described for the leg 21, and these need not be explained, it being recognized that one is a mirror-image of the other.

The free end 31 of the riser strap 30 is held securely to the length 34 by stitching 50. The end of the riser 30 on the leg 22 is similarly secured.

Connected to the same hardware 24 and 25 as the risers, is the shock absorber material. This material comprises a plurality of individual straps, with each strap being continuous over both sides of each leg 21 and 22 of the riser arrangement. The straps are used in multiple laminations for added response to high force onset and greater strength, and may be thought of as a group or or assembly.

The shock absorber strap assembly is designated generally by the numeral 60. It comprises a plurality of laminations 61, 62, 63, 64 and 65 of plastic. The number of laminations, while illustrated here as being five in number, is subject to change, depending upon the degree of resistance desired or required. Thus, the number of laminations required will be greater or less if a man is to be dropped in contrast to an objective of lighter or heavier weight.

The plurality of layers 61—65 are all formed of a single strip of vinyl or a similar plastic. That strip is in the form of a flattened tube 66, illustrated in cross-section at FIGURE 11. The tubular form of the plastic is accomplished by extruding the plastic in cylindrical or tubular form, and thereafter flattening it. This shape of the continuous strap 66 eliminates exposed edges of the plastic, thereby increasing tear resistance. The plastic strap 66 has ends 67 and 68. These ends are cemented or heat sealed to the adjacent layer, as will be described.

The preferred shock absorber material is a product of the Monsanto Chemical Company, called opalon. It has the properties of being capable of 300% elongation before breaking. If elongated less than 100%, it will, after a period of time, return to its original length. It has tensile strength of approximately 3100 p.s.i. The dimensions of the plastic used are approximately 1¾" wide by 0.012 inch thick, although these may be varied. Because this material stores only about three-fourths of the energy imparted to it by tensile forces, it tends to return slowly to its original length. Consequently, it does not have the jolting rebound characteristics of elastic material such as rubber.

The manner by which the plastic laminations 61—65 are wrapped about the risers 30 will be described by considering these plastic layers as a group 69. Because the ends 67 and 68 of the strap 66 are properly heat sealed or cemented to one another, the group 69 may be thought of as an endless group.

The group 69 will be described beginning at the top of the riser arrangement as viewed in FIGURE 1. It is looped around the hardware 49, as at 70; then it stretches down the outer side of the leg 21, as at 71, throughout the entire length of the leg 21, and extends around the hardware 32, as at 72. Thereafter it continues upwardly along the inner side of the leg 21, as at 73, and again wraps around the hardware 47, as at 74, but this time between the hardware 74 and the portion 46 of the riser 30. The group 69 extends downwardly along the inner side of the right riser leg 22, as at 75, wraps around the hardware 25, as at 76, and then extends up the outer side of the right riser leg 22, as at 77, to meet the portion 70 with which this description began.

It can be seen from the preceding description that the shock absorber group 69 lies against both sides of the riser legs 21 and 22. Therefore, there is a shock absorber resistance equal to double the number of laminations 61—65. It can further be appreciated that the shock absorber group 69 does not have the folds that the non-yielding risers 30 have, so that, initially, the shock absorber group 69 is considerably shorter than the risers. The shock absorber group also forms a loop confining the folded riser and restraining the deployment thereof.

An arrangement is provided for securing the several laminations 61—65 together so that they will function as a group. This arrangement comprises a plurality of wrappings formed of the same vinyl plastic as the shock absorbers. One of these wrappings is indicated by the numeral 80. (See FIGURE 6.) This wrapping 80 is a single strip of the flattened tubular vinyl plastic which is wrapped about and between each or several of the laminations 61—65 of the two group extensions 73 and 75, slightly spaced from the hardware 49.

With reference to FIGURE 6, the wrapping 80 has a leading end 81 which is cemented or heat sealed between the laminations 63 and 64 of the portion 73 which lies along the inner side of the leg 21. The wrapping 80 then winds between each or several laminations 61—65 and is cemented or heat bonded to each lamination. The trailing end 82 of the wrapping 80 is cemented or heat sealed to the adjacent wrapping layer. Thus, the wrapping 80 transfers forces from side to side of the shock absorbing material on both sides of the riser.

It should be stated that there is a short length of bearing material 85 which is doubled over, as at 86, so that it extends a short distance along the inner sides of both legs 21 and 22. This bearing material is readily constructed of the same unyieldable substance as are the risers 30, and is secured between the legs 21 and 22 only by the pressure of the wrappings presently being described. It is the bearing material 85 which rubs against the hardware 49 and increases the bearing area accordingly. As can be seen at FIGURE 3, this bearing loop 85, and that portion of the shock absorbers adjacent it, extend beyond the wrapping 80 so that it can be spread to receive the hardware 49.

In order to bind the riser portion adjacent the loop 48 independently of the shock absorbers and prevent the risers from sliding through the hardware due to unequal loading, a wrapping 90 is provided. This wrapping 90 makes a single turn about the riser just below the loop 48. The ends of the wrapping 90 are stitched or cemented together, and the wrapping is stitched or cemented to the riser. The wrapping is conveniently formed of the same nylon as are the risers.

There is a plastic wrapping 94 for the group extensions 71 and 77 near the hardware 49. This wrapping 94 is similar to the wrapping 80 except that it does not pass between laminations 61—65, but between alternate ones. (Either the wrapping 80 or the wrapping 94, between all or only some of the laminations has been found satisfactory. Other forms of wrapping may be possible so long as they hold the several laminations together about the adjacent hardware and distribute forces between the two sides.) As illustrated, the wrapping 94 has its leading end 95 located outside the inner two plastic laminations 64 and 65. The wrapping 94 then is wound about the inner two laminations 64 and 65 of the group extension 71, as at 96. It is thereafter passed between alternate laminations until its outer portion surrounds the lamination 61, and its trailing end 97 is heat sealed to the adjacent portion of the wrapping 94.

Passing from the wrapping about the riser arrangement adjacent the hardware 49 to the leg 21, it can be seen from FIGURES 1, 4 and 5 that there are a plurality of wrappings 100 about the risers alone, exclusive of the shock absorber straps. (The arrangement of these riser wrappings is the same for the leg 22 as for the leg 21.) The wrappings 100 are not bound to the risers themselves but only make a single loop with the ends of the wrappings sealed together. Thus, the risers can slip out of the loops 100 under a small exertion of force. These retain riser folds and also prevent friction burns on the risers as they deploy.

There are two wrappings 100 for each triple layer of riser strap (e.g. about the riser portions 38, 40 and 41 are wound two wrappings 100) except for the three layer section 34, 36 and 38 adjacent the hardware 25 there is only one loop 100. These wrappings or loops 100 keep the folded risers in place. While the provision of two such wrappings per each three-layer riser section has been found the best, more or less may be used.

As ilustrated at FIGURES 1, 5 and 7, there is a nylon strengthening loop 103 wrapped about the hardware 32 in fashion similar to the loop 85 and there is a wrapping 104 about each leg 21 and 22, adjacent the hardware 25, which binds the shock absorber straps. The wrapping 104 has a leading end 105 secured outside the innermost strap 61. It then winds, at 106, between the straps 61 and 62 of the extension 75, passes at 107 inside strap 62 of extension, 73, then at 108 between straps 63 and 64 of extension 75, between straps 63 and 64 at extension 73, at 109, and finally makes a complete turn 110 around the shock absorber group with its trailing end 111 sealed to the adjacent portion of the wrapping. Again, other wrapping forms are possible, so long as they bind the shock absorber straps at a slight spacing from the hardware 25. In addition it may be desirable to provide a single loop of plastic about the entire legs 21 and 22, as between the wrapping 104 and the lowermost wrapping 109, as shown in FIGURES 1 and 5.

A sleeve 112 is provided for covering substantially all the riser assembly in its folded, unextended condition. For this purpose, the sleeve, which may be constructed of a single piece of canvas, or other suitable material, has two legs 113 and 114 for covering the riser legs 21 and 22. Appropriate stitching 115 permits the appropriate shape illustrated at FIGURE 2, and the stitching 115 is terminated so as to provide an opening 116 through the sleeve for the hardware 24. The face ends 117 and 118 of the legs 113 and 114 at least cover the hardware pieces 25 and may even extend slightly beyond what is required for that purpose. These ends 117 and 118 are open.

An important advantage attributable to the sleeve 112 is that it prevents wind blast damage to the shock absorber. It also protects the riser arrangement from catching on various objects against which it might brush. It also protects the riser from being whipped around the head by broken laminations. At the same time, the risers and shock absorbers can freely extend through the open ends 117 and 118 whenever a tensile force is applied.

In operation, the riser assembly is arranged with the hardware 24 connected to the object to be dropped and the hardware 25 connected through appropriate lines to the canopy. Generally two such riser assemblies 20 will be used. Before the parachute deployment, the riser assemblies are completely covered by the sleeve 112, as illustrated in FIGURE 2, and are appropriately folded for those uses in which the canopy is wrapped for being carried by an appropriate harness. As illustrated in FIGURE 1, the risers are folded, and the shock absorber straps are unextended. When the actuating means causes the canopy to be released for opening, that canopy is subjected to tremendous opening forces. As illustrated at curve A of the graph of FIGURE 10, these opening forces may be in the neighborhood of 10,000 pounds. (The graph of FIGURE 10 is a schematic reproduction of an actual test conducted with a dummy weight of 300 pounds dropped at a distance of 20 feet.) Curve A represents the shock forces of the regular parachute having non-yieldable risers. Curve B shows these same forces distributed over a longer period of time and force peaks being reduced proportionally through the shock absorber straps 61 through 65.

As the shock absorber straps 61—65 begin to take the force of opening, they proceed to elongate. As they elongate, the riser 30 begins to unfold by slipping through the wrapping loops 100. The shock absorber straps 61 through 65 being capable of 300% elongation before breaking, they will normally not break before the riser 30 is fully extended. However, during the application of forces which causes the shock absorber straps 61 through 65 to elongate and before the riser strap 30 is fully extended, substantially all of the forces produced are dissipated by the straps 61—65. Those forces will follow a distribution pattern relative to time which resembles the curve B of FIGURE 10. When and if the shock absorber straps have elongated so far that the risers are fully extended, the risers will then prevent the straps from further elongating, and will take the remaining canopy forces. However, by this time, the tremendous opening force peaks have been dissipated through the shock absorber straps and there remains a relatively uniform force exertion upon the riser 30, being that of the canopy opposing the force of gravity as the object descends.

The graph of FIGURE 10 is a plot of force against time with force being in thousands of pounds and time in seconds. It has been found through experiment, that this graph is representative of the force distributions which have occurred. A number of tests were conducted, all verifying the representative connection of the graph.

Before the risers are extended, the sleeve 112 prevents the shock absorber straps and risers from catching on various objects against which they might brush while, at the same time, preventing the risers from flapping in the wind. Because the ends 117 and 118 of the sleeve 112 are open, some of the risers can readily extend from within the sleeve. When the risers are extended, the sleeve still covers a portion of them, as illustrated in FIGURE 9.

What is claimed is:

1. A shock absorber arrangement for parachutes and the like comprising a non-yieldable riser and a yieldable strap; said riser and strap having their ends connected to a common pair of connecting means; said yieldable strap being of undrawn, non-fibrous, vinyl plastic and having the property of remaining elongated over a considerable length of time once it has been extended, the cross section of the yieldable strap being in the form of a flattened loop.

2. A shock absorbed arrangement for parachutes and the like comprising non-yieldable riser means and yieldable strap means; the yieldable strap means comprising straps of undrawn non-fibrous vinyl plastic means for attaching one end of the riser means and the strap means to a parachute and means for attaching the other end directly to a supporting harness; said riser means being considerably longer than said yieldable means before yielding; said yieldable means being capable of elongating under tension and remaining elongated after the tension is removed, said yieldable means having the property of returning to its unextended length after a period of time following the release of said tension.

3. A parachute riser assembly comprising in combination a non-yieldable riser and a yieldable strap, both connected to common fasteners at their extreme; said riser being initially longer than said strap and said strap being extendable according to the magnitude of tensile force applied to it; said strap being of undrawn, non-fibrous vinyl plastic having the property of remaining elongated over a considerable length of time after said tensile force is removed, the riser being initially folded and being extendable as the yieldable strap elongates, and means for holding the riser and the strap close together as the strap elongates.

4. A parachute riser assembly capable of assuming an initial condition and an extended condition comprising a riser strap and at least one shock absorber strap adjacent it; said riser strap being of flexible, non-yieldable material; said shock absorber being of flexible, yieldable non-fibrous vinyl material initially considerably shorter than the riser strap; said riser strap when in its initial condition, being folded so that its ends are adjacent the ends of the shock absorber strap; said riser strap being freely extendable from its initial folded condition upon elongation of said shock absorber strap, the assembly including a plurality of loops encircling the folds in said riser strap; said loops being so arranged as to permit movement of the folds parallel, but not normal, to the riser, and prevent friction burns on the riser.

5. The assembly of claim 4 plus a sleeve covering the assembly in its initial condition; said sleeve having an open end for permitting the riser and shock absorber straps to elongate through the open end.

6. A parachute riser assembly having a riser strip bent at its center to form two substantially equal branches; means for attaching said middle to an object to be dropped; means for attaching the free ends of the branches to a parachute canopy; said riser branches each having a folded condition and an extended condition; means for releasably holding the risers in their folded condition while they unfold; and yieldable, substantially non-elastic, non-fibrous vinyl plastic strap means connected between the object and the canopy for absorbing all tensile forces between the canopy and the object unless said riser branches become extended.

7. The combination of claim 6 wherein the yieldable means has the property of remaining elongated over an extended period of time when it has yielded to that condition.

8. The combination of claim 6 including a sleeve covering the branches in their folded condition through which the branches can extend.

9. The combination of claim 8 wherein the sleeve covers the free ends of the branches in their folded condition.

10. A shock absorber for a parachute wherein there is a parachute canopy with at least four groups of shroud lines, each group of shroud lines having first and second ends, the first end of each group being connected to the parachute, separate first shroud line hardware connecting means for each shroud group, the second end of each group of shroud lines being attached to a separate one of the first hardware connecting means, a harness for supporting a mass, the harness having separate second hardware connecting means adjacent opposite sides of the harness, a plurality of riser strap branches, including at least two pairs, for connecting the shroud lines to the harness, each riser strap branch having first and second ends, the first end of each branch being attached to a separate one of the first shroud line hardware connecting means, the second ends of each pair of the riser branches being supported by one of the second harness hardware connecting means, the riser strap branches being constructed of flexible, non-yieldable, material, and a plurality of shock absorber strap means attached to the shroud line hardware connecting means and supported by the harness hardware connecting means, the shock absorber strap means being initially considerably shorter than the riser strap branches and being formed of yieldable, substantially non-elastic plastic, the riser branches being initially folded with the folded layers of each branch arranged parallel to one another, the shock absorber strap means including strap layers on opposite sides of the folded riser layers for providing lateral confinement of the riser strap branches as they unfold when the shock absorber-strap means stretch.

11. The combination of claim 10 wherein the riser strap branches are formed in flat strips having a width considerably greater than the thickness of the strips, the shock absorber strap means being in the form of flat strips having a width approximately equal to the width of the riser strips and having a thickness considerably less than the width.

12. The combination of claim 11 wherein there are a plurality of loops of material spaced along each riser branch, the loops of each branch surrounding the riser layers.

13. The combination of claim 10 wherein the pairs of riser branches supported by each one of the harness hardware connecting means each comprises a single strap and the shock absorber strap means adjacent each pair of riser branches are unbroken between the connections to the shroud line hardware connecting means, and there is a loop of unyieldable material wrapped about both branches and the shock absorber strap means adjacent both branches, the loop of unyieldable material being near the harness hardware connecting means.

14. A shock absorber for a parachute, the parachute having a canopy and a plurality of shroud lines connected to the canopy, a harness, and a plurality of unyieldable riser straps connected between the shroud lines and the harness, a plurality of yieldable, substantially non-elastic shock absorber straps connected between the shroud lines and the harness, the riser strap being initially substantially longer than the shock absorber straps, each riser strap being folded with the folded layers of each riser strap lying alongside one another, there being at least two shock absorber straps positioned on opposite sides of each folded riser strap, a plurality of loops wrapped about the folded layers of each riser strap and a plurality of loops wrapped about the folded layers and the shock absorber straps adjacent each riser strap, the loops permitting the shock absorber straps to elongate and the riser straps to unfold, but preventing substantial lateral flapping of the riser and shock absorber straps.

15. The combination of claim 14 wherein the riser straps are approximately three times as long as the shock absorber straps.

References Cited in the file of this patent

UNITED STATES PATENTS

| 2,336,312 | Strong | Dec. 7, 1942 |
| 2,452,228 | Dawes et al. | Oct. 26, 1948 |
| 2,462,234 | Supina | Feb. 22, 1949 |
| 2,474,124 | Schultz | June 21, 1949 |
| 2,825,515 | Gold | Mar. 4, 1958 |

FOREIGN PATENTS

| 8,649 | Great Britain | 1915 |
| 262,832 | Italy | Feb. 21, 1929 |